United States Patent Office 3,503,279
Patented Mar. 31, 1970

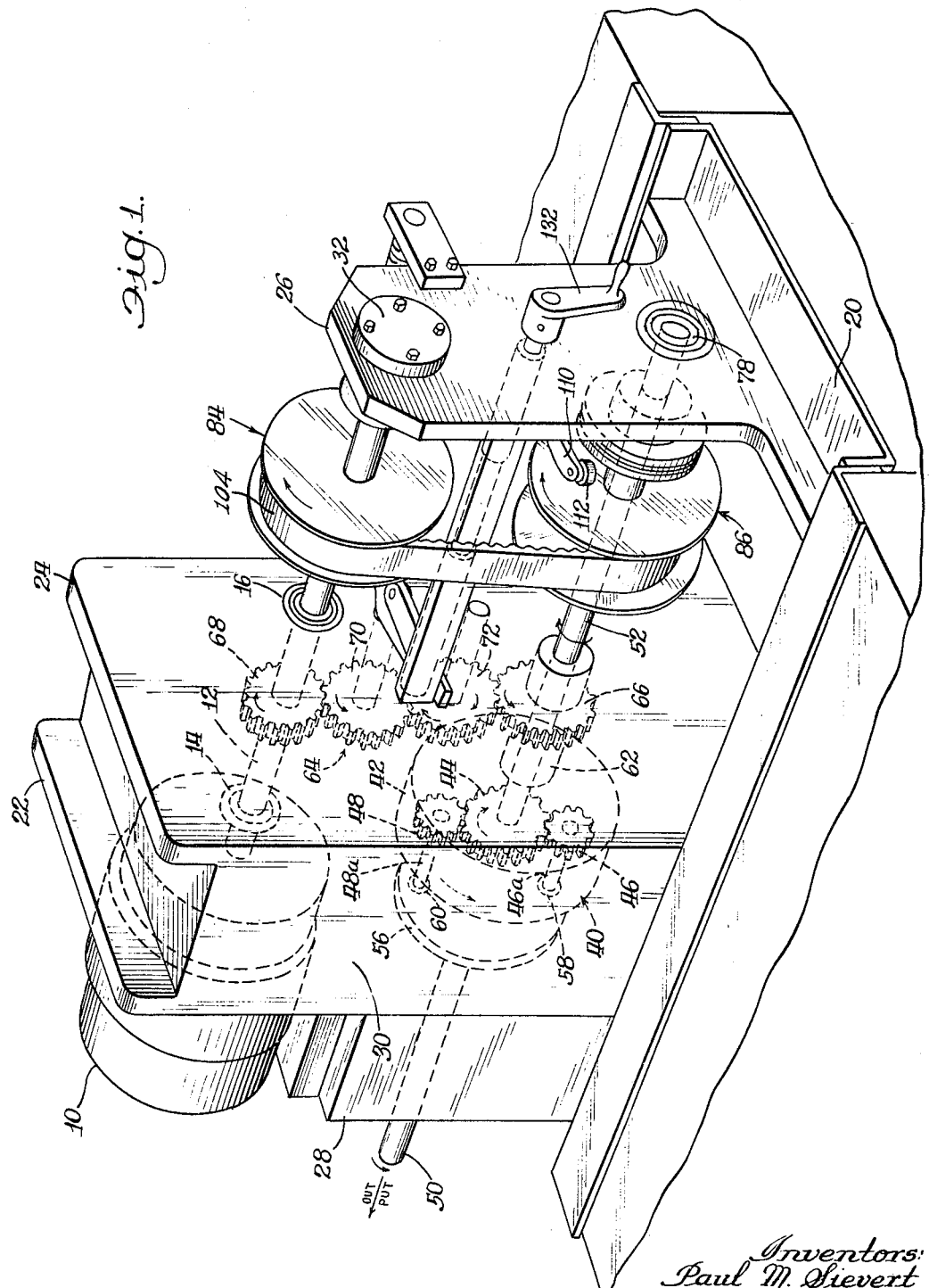

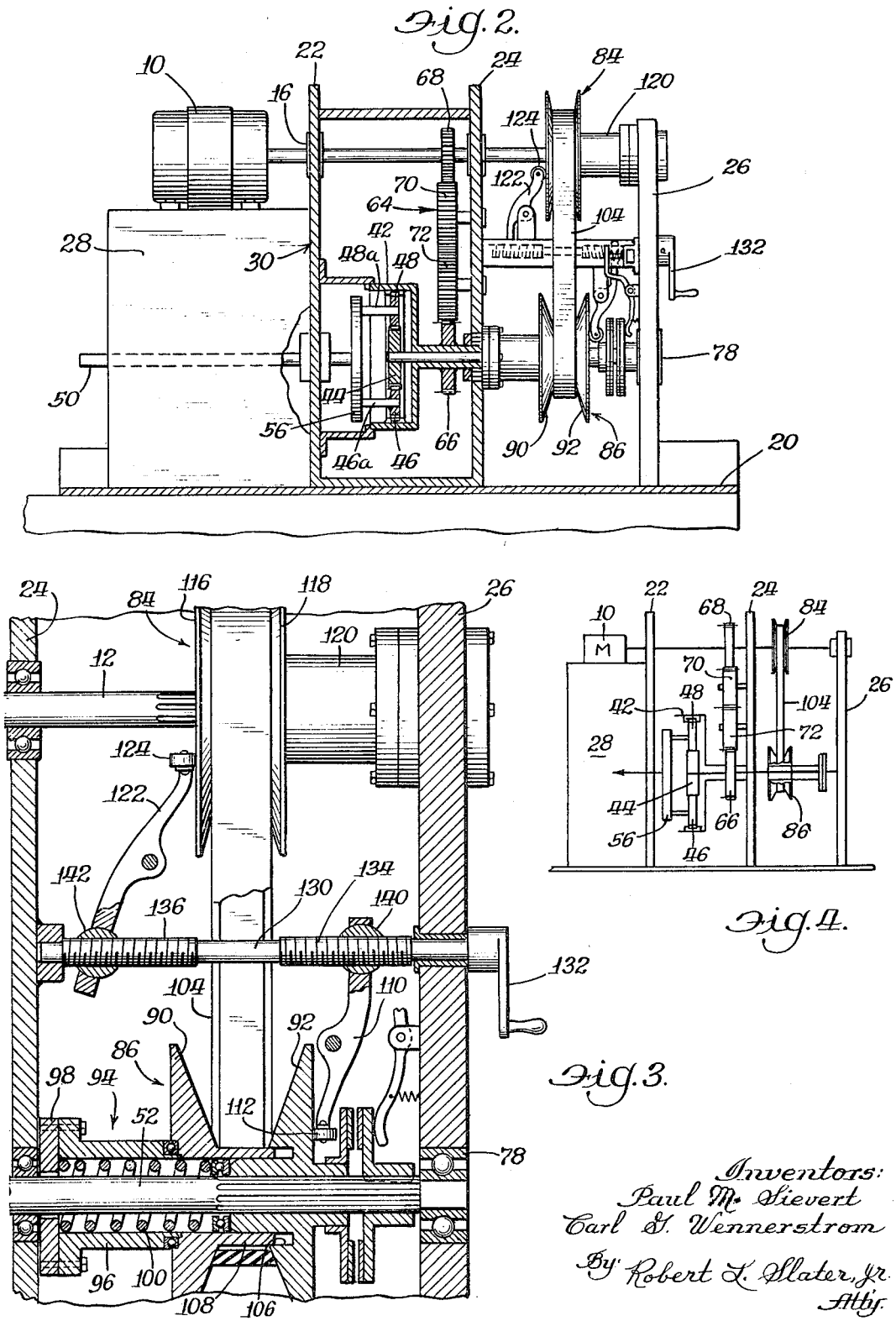

3,503,279
VARIABLE SPEED POWER TRANSMISSION MECHANISM
Paul M. Sievert, Oak Park, and Carl G. Wennerstrom, Evanston, Ill., assignor to Sievert Electric Co., Chicago, Ill., a corporation of Illinois
Filed June 1, 1967, Ser. No. 642,767
Int. Cl. F16h *37/12*
U.S. Cl. 74—689                                                  2 Claims

ABSTRACT OF THE DISCLOSURE

The novel invention comprises a general purpose variable speed and reversible power transmission comprised of input and output shafts mounted in spaced parallel arrangement, a planetary gear set and two mechanical energy transmission path means independently linking through the planetary gear set the input and output shafts.

BACKGROUND OF THE INVENTION

The present invention relates to general purpose mechanical power transfer devices, more particularly it relates to variable speed and reversible direction power transfer devices suitable for high torque low speed applications, having plural paths for the transmission of work between the input and output shafts.

Coupling rotating shaft energy between a high speed prime mover output shaft and a tool or vehicle is a universal and recurring challenge. There are endless varieties of mechanical power applications wherein variable speed and variable work load or horsepower are demanded in the output. Some mechanical power applications, in addition to variable speed and work load in the output, require reversibility and high starting torque. The literature describes many specialized power transfer devices adapted to function within certain limited values of output speed, output work load, and starting torque. General purpose power transfer devices, however, adapted to variable speed, variable work load, reversible, and high torque at low and zero speed conditions are not, broadly speaking, available.

Electric motors as a general rule except for the D.C. shunt wound variety, operate most effectively if not only at constant relatively high speed output shaft rotation rates. Deisel engines are in general constant speed devices. Steam and gas turbine engines are most efficient when operated within a relatively narrow range of output shaft speeds. The reciprocating internal combustion engine, while subject to variation in output shaft speed, exhibits very low work load capacity at low speed. The power train coupling between any of the aforesaid prime mover devices and a practical tool or a vehicle drive wheel, must transform the mechanical shaft energy from the prime mover to the work load at the desired output speed, rotational direction, and torque/speed ratio. There continues to be a need for improved general purpose power transmission devices readily adapted to any one of a wide variety of applications.

For instance, on board ship there are cargo cranes, winches, mooring tackle, hoists, elevators and a host of other applications where sizable loads need to be handled which demand high torque at low speed even at zero speed in the mooring tackle, reversibility and most important of all readily controlled variable output speed. Industrial tools for instance such as heavier machine tools, conveyors, hoists and small work vehicles have power requirements that may vary in any given application from reverse through zero to high speed forward output at various work loads and frequently with a high torque at zero or low output shaft speed. There continues to be a need for improved general purpose power transmission devices having simple inexpensive construction and providing rugged reliable performance under extreme conditions of variable work load, speed, direction and torque/speed ratio.

Heretofore, power transmission devices suitable for variable speed and variable work load applications have provided for transmission of a surplus margin of mechanical energy through the forward path of the device to meet extra or severe load requirements and dissipation into the work load or into functional losses of any unused portion of the available mechanical energy. The efficient utilization of surplus mechanical energy required at the input to a mechanical power transmission has not been heretofore a design objective.

It is accordingly, one object of our invention to provide a general purpose controlled output speed power transmission device.

It is another object of our invention to provide a general purpose power transmission device having a substanially constant horsepower or work output rate throughout a broad range of output shaft speeds.

It is another object of our invention to provide a general purpose power transmission device having reverse output shaft rotation capability.

Still another object of our invention is to provide a power transmission device capable of exerting for an extended time interval a large torque at the output shaft at zero rotation rate.

Yet another object of our invention is to provide a power transmission device having plural paths for transmission of mechanical energy between the input shaft and the output shaft wherein one path is adapted to transmit surplus unused mechanical energy from the output shaft back to the input shaft.

These and other objects and advantages of our invention will be apparent from the following drawings, specification and claims.

SUMMARY OF THE INVENTION

Briefly stated our invention is a general purpose power transmission comprised of input and output shafts mounted in a spaced parallel arrangement, a planetary gear set and two mechanical energy transmission path means independently linking through the planetary gear set the input and output shafts. The first linkage comprises a conventional gear train or other fixed speed ratio linkage mounted between the input shaft and the planetary ring gear. The output shaft is coupled to the planetary gear set through a bracket to one or more planet gears. The second linkage between the input shaft and the planetary gear set comprises a controlled variable speed ratio linkage such as for instance a variable pitch pulley and belt. The second linkage is connected between the planetary set sun gear and the input shaft. Thus the output shaft rotation direction and shaft speed may be controlled by adjustment of the speed ratio of the second path linkage; any unused mechanical energy transmitted to the output shaft through the first path will be returned back to the input shaft through the second path.

BRIEF DESCRIPTION OF THE DRAWINGS

FIGURE 1 is a perspective view of a preferred embodiment of our invention. Certain of the internal features of our invention are shown in broken or hidden lines.

FIGURE 2 is a cut away sectional view as see on plane 2—2 of the embodiment in FIGURE 1.

FIGURE 3 is an enlarged fragment of the view shown in FIGURE 2.

FIGURE 4 is a schematic diagram illustrative of the essential elements of our invention.

DESCRIPTION OF PREFERRED EMBODIMENT

Referring now to the drawings, FIGURE 1 illustrates in a perspective view a preferred embodiment of our invention wherein a source of mechanical energy, an electric motor 10 in the illustrated embodiment, is mounted to power a first or input shaft 12. The shaft 12 is journaled in bearings 14 and 16.

The motor 10, shaft 12, bearings 14 and 16, and other component members to be desribed below are mounted respectively within a frame comprised of a base 20, upon which are positioned at a spaced distance three vertical panels 22, 24, and 26; a motor mount 28 is positioned a fixed distance from the first panel 22. The space between panels 22 and 24 is enclosed within a casing 30 to prevent lubricant from spraying.

The input shaft 12 extends through the vertical three panels 22, 24 and 26 and terminates in a bearing 32 mounted in panel 26.

A planetary gear set 40 comprised of a ring gear 42, sungear 44 and two planet gears 46, 48 is positioned between panels 22 and 24. The planetary gear set is supported by two shafts, the first of which is the output shaft 50, and the second of which is referred to as a control shaft 52. The output shaft 50 is connected through a bracket 56 which in turn is rotatably connected to the two planet gears 46 and 48 by short planet gear shafts 46a, 48a. The planet gear shafts are journaled in small sleeve bearings 58 and 60 mounted within the bracket 56. When the planet gears 46, 48 rotate about a common center, that is, the center of the sun gear 44, the bracket is caused to rotate similarly, and in turn imparts torque to the output shaft 50.

A gear train 64 having an even number of gears rotatably connects the input shaft 12 to the ring gear 42. The ring gear is provided with a hollow shaft 62 about which is fixedly mounted the drive gear 66. A driver gear 68 is fixedly mounted to the input shaft 12. Idler gears 70, 72 complete the gear train 64.

The control shaft 52 is journaled at one end within the interior of the ring gear hollow shaft 62, and terminates on the sun gear 44 which is rigidly mounted thereon. The second end of the control shaft 52 is journaled in a bearing 78 which in turn is mounted within the vertical panel 26. The control shaft 52 and the input shaft 12 are mounted in parallel spaced arrangement. The output shaft 50 is mounted in axial alignment with the control shaft 52, but of course extends outward from the bracket 56 beyond the plane of the planetary gear set.

A variable pitch diameter pulley set and drive belt is mounted to connect the input shaft 12 and the control shaft 52. The detailed construction of the pulley and drive belt, which comprises a second path for transmitting mechanical energy between the input shaft and the planetary gear set, is more readily visualized by reference to the illustrations, particularly FIGURE 3.

Variable pitch diameter pulleys 84 and 86 are mounted respectively on the input shaft 12 and the control shaft 52. The two pulleys are substantially identical except for right and left hand symmetry. Referring now to the cross-section view of pulley 86 in FIGURE 3, the pulley 86 is comprised of two beveled pressure plates 90 and 92. A spring loaded assembly 94 comprised of a flanged cylinder 96, a retaining cap 98 and a helical spring 100, holds the pressure plate 90 firmly against one side of the drive belt 104. The retaining cap 98 is mounted by means of a lock screw to the control shaft 52.

The pressure plate 92 is mounted coaxially on the control shaft 52 and is provided with a toroidal recess 106 into which a short hollow cylindrical extension 108, integral with the pressure plate 90 may be telescoped. A retaining bracket 110, which terminates with a low friction roller 112 presses against the plane exterior surface of pressure plate 92.

The pitch diameter of the pulley 86 may be controlled by adjusting the position of the bracket 110 and contact roller 112, which in cooperation with the spring load assembly 94 regulates the spacing between the beveled sides of the pressure plates 90 and 92.

The pulley 84 is constructed in all respects similarly to pulley 86 described above. It is comprised, for instance, of two beveled pressure plates 116, 118, a spring loaded assembly 120, and a retaining bracket 122 with a low friction contact roller 124. The mounting of pulley 84 on the input shaft 12 is in transverse alignment with the mounting of the pulley 86 on the control shaft 52. However, the positioning of the two pulleys on the respective shafts 12 and 52 is in reverse right and left hand alignment. The advantage of the reverse right and left hand mounting relates to simplified mounting of the retaining brackets 110 and 122.

A shaft 130 with a hand crank 132 is rotatably mounted parallel with and midway between the input shaft 12 and the control shaft 52. Threaded sections 134 and 136 are provided on the shaft 130. Threaded toggles 140 and 142 mounted to the retaining brackets 110 and 122 respectively and passed over the threaded section 134 and 136 respectively cooperate to simultaneously and appropriately position the contact rollers 112 and 124 against the pulley beveled pressure plates 92 and 116 to provide proper spacing between the pressure plates of the two pulleys 84 and 86 to afford reciprocal change in the pitch diameters of the pulleys while maintaining a constant belt length. When the hand crank 132 is rotated the retaining brackets 110 and 122 are moved linearly and thus simultaneously adjust the spacing between the beveled pressure plates 90 and 92 and 116 and 118 respectively. For each incremental change of separation between plates 90 and 92, for instance an equal but opposite sign change in the incremental separation between plates 116 and 118 is made. By this arrangement within a broad range any ratio of shaft speed between the input shaft 112 and the control shaft 52 may be achieved.

Operation of our invention may be described as follows. The motor 10 normally rotates the input shaft 12 at a constant speed of rotation. Loads connected to the output shaft 50 vary in requirements for direction of rotation, speed of rotation and horsepower or work utilized. If the hand crank 132 is adjusted so that the ratio of pitch diameter of the two pulleys 84 and 86 is unity then the control shaft 52 will rotate the sun gear 44 at the same rotation rate as the input shaft 12. Under such circumstances and assuming certain favorable gearing ratios the planetary gear set output through the planet gears will be at zero velocity. The ring gear 42 will rotate at the same speed but in opposite direction to the sun gear 44. The planet gears 46 and 48 will rotate rapidly about their respective axis but not orbit about the center of the sun gear 44. The output shaft 50 is actuated only when the planet gears 46 and 48 orbit about the sun gear center.

When the ratio of rotational velocity between the sun gear 44 and the ring gear 42 is varied from unity assuming certain favorable gearing ratios the planet gears 46 and 48 will revolve or orbit about the sun gear center and in turn rotate the output shaft 50. For instance, if the control shaft 52 is rotated at a gain in velocity over that of the input shaft 12, which is easily accomplished by closing pulley 84 and opening pulley 86, then the planet gears 46 and 48 orbit the sun gear and reverse rotation of the output shaft is obtained. On the other hand, if the speed ratio between the input shaft 12 and the control shaft is made less than unity, i.e. the control shaft is rotated more slowly than the input shaft, then the ring gear, sun gear speed ratio becomes greater than unity, the planet gears revolve in a forward sense about the sun gear center and the output shaft 50 rotates in a forward sense. By selecting the appropriate ratio between the pitch diameters of the pulleys 84 and 86 very rapid forward motion equal to or greater than the input shaft speed may be obtained.

Consider the situation where the load work requirements vary in time and the horsepower available at the planet gears for rotating the output shaft 50 is not utilized, then mechanical energy will feed through the sun gear 44 and control shaft 52, and through the pulley and belt system to the input shaft 12. Accordingly, unused mechanical energy may be returned to the input shaft, under certain conditions of load demand and shaft speed ratios.

The following table will illustrate the range of output shaft speeds and the change of direction of rotation of the output shaft which is obtainable by means of adjustment of the ratio in pitch diameter of the belt drive sheaves or pulleys 84 and 86. Consider that the input shaft 12 is driven by the motor 10 at a constant 1750 r.p.m., accordingly, drive sheave 84 rotates at 1750 r.p.m., then the output shaft will rotate at the speeds shown in the table for each respective setting of the sheave pitch diameter ratios.

| Pitch diameter ratio between drive and driven belt sheaves: | R.p.m. output shaft |
|---|---|
| 1-2 | +944 |
| 1-1 | +581 |
| 1-1.83 | 0 |
| 1-2.28 | −200 |

It is to be understood that the maximum forward or reverse output shaft speeds are not limited to those values shown in the above table which are merely illustrative of the design parameters useful for a typical shipboard application of our invention.

In an alternate embodiment (not shown), a suitable hydraulic means may be used instead of the pulley and belt arrangement to control and vary the rotational speed of the sun gear.

The foregoing description of a preferred embodiment of our invention is intended merely as illustrative of our invention the scope and limits of which are set forth in the following claims.

We claim:
1. A variable speed power transmission comprising:
   an input shaft and an output shaft;
   a planetary gear set comprised of a ring gear means, a planet gear means and a sun gear means, said planet gear means having teeth meshed with teeth of the sun gear means and teeth of the ring gear means;
   a hollow stub shaft rigidly associated with the ring gear means;
   gearing means associating the stub shaft with the input shaft, said gearing means having one gear fixedly connected to the stub shaft and another gear fixedly connected to the input shaft whereby the stub shaft rotates in an opposite direction with respect to the input shaft;
   a control shaft connected to the sun gear means and passing inside said stub shaft; and
   an adjustable rotatable means associating said input shaft with the control shaft, said output shaft being associated with the ring gear means, whereby the rotational velocity of the output shaft may be varied from a forward rotation through zero to a reverse rotation by adjustment of said rotatable means.

2. The variable speed power transmission of claim 1 wherein said rotatable means comprises:
   a first pulley means associated with the input shaft and a second pulley means associated with the control shaft;
   a belt means coupling said pulleys together;
   at least one of said pulleys having variable diameter means for varying the relative speed of rotation of the control shaft with respect to the input shaft, whereby the rotational velocity of the output shaft may be varied from a forward rotation through zero to a reverse rotation by adjustment of said variable diameter means.

References Cited

UNITED STATES PATENTS

| 2,076,926 | 4/1937 | Timmermann | 74—689 |
| 2,446,462 | 8/1948 | Dodge | 74—689 |
| 3,000,584 | 9/1961 | Clem | 74—689 X |
| 3,396,607 | 8/1968 | Ross | 74—687 |
| 2,916,949 | 12/1959 | Smith et al. | 74—689 |
| 3,257,867 | 6/1966 | Dennick | 74—689 |
| 3,334,527 | 8/1967 | Carnegie | 74—689 |

FOREIGN PATENTS

| 689,262 | 3/1953 | Great Britain. |

ARTHUR T. McKEON, Primary Examiner